United States Patent Office 3,120,621
Patented Feb. 4, 1964

3,120,621
THERMIONIC ENERGY CONVERTER
Karl-Georg Günther, Nurnberg, and Walter Hänlein, Erlangen, Germany, assignors to Siemens-Schuckertwerke Aktiengesellschaft, Berlin-Siemensstadt, Germany, a corporation of Germany
Filed Dec. 28, 1961, Ser. No. 162,789
Claims priority, application Germany Dec. 29, 1960
10 Claims. (Cl. 310—4)

Our invention relates to the direct conversion of thermal energy into electrical energy without the aid of moving mechanical parts by means of electric current generators of the thermo-electronic or thermionic type.

Such generators are essentially diode-type vessels which are evacuated and filled with slight quantities of gas or vapor, the large-area cathode of the vessel being heated by the thermal energy to be converted. Other energy converters are based upon thermal ionization of a heated gas which thereafter passes at high speed through a magnetic field, the electric charges being separated and taken off by means of collector electrodes. This requires continuous operation at gas temperatures of 2000° C. or more which involves difficulties as to materials, design and performance of such generators.

It is an object of our invention to devise a thermionic energy converter that minimizes such difficulties and is also suitable for higher output voltages than heretofore economically obtainable.

In accordance with our invention, we provide the energy converter with a mixture of a driving gas or vapor and a readily ionizable metal addition finely distributed in the driving medium, and we employ the heat to be converted for increasing the temperature of this mixture and pass the heated mixture through a circulatory system in which the metal addition is ionized by contact with a metallic cathode, whereafter the ions of the metal addition are electrically discharged at an anode, before the driving medium with the metal addition is compressed and again supplied to the cathode or entrance portion of the circulatory system. We further provide the anode and cathode with terminal pieces from which the generated electrical energy can be taken.

According to another feature of our invention, the finely distributed metal addition to the gaseous or vaporous driving medium preferably consists of at least one metallic element from the lithium subgroup in the first group of the periodic system of elements, namely the group that comprises the elements Li, Na, K, Rb, Cs (Fr). As a rule, the metal addition from the lithium subgroup is present in vapor form and thus is uniformly distributed throughout the driving medium. As a rule, the use of cesium and/or potassium as an addition metal is preferable for reasons of economy and because of the low ionization voltage of these elements. During operation both metals are always in vaporous constitution.

The driving medium preferably consists of an inert gas such as argon. When using driving vapors, those that can be condensed under the operating conditions of the converter plant are well suitable, mercury vapor being thus applicable for example.

The thermionic generator may be so designed that the cathode, used to provide contact ionization, is directly heated by the thermal energy to be converted and in turn imparts heat to the gas-vapor mixture. However, the design of the converter may also be such that the heat to be converted primarily heats the gas-vapor mixture which in turn effects heating of the cathode at which contact ionization of the added metal is to occur.

According to still another feature of our invention, the outlet portion of the cathode is designed as a Laval nozzle so that the heated mixture of driving medium and metal is accelerated to velocities at least near sonic speed or also to higher speed values.

The useful output voltage of the energy converter is preferably made adjustable. This can be done by correspondingly dimensioning the proportion of the readily ionizable metal addition in the mixture. However, the converter design and operation may also be such that the magnitude of useful terminal voltage can be adjusted by varying the temperature of the ionizing cathode surfaces.

A thermionic energy converter according to the invention, aside from being suitable for the generation of a direct voltage, can also be employed for generating pulsating or alternating voltage. This can be done, for example, by providing the fluid circulation system of the converter with devices for periodically varying or reversing the speed of fluid mixture.

According to a further feature of the invention, the efficiency of the thermionic energy converter can be increased by supplying the heat content of the electrically discharged mixture to a second energy converter or to other heat-power engines operating at lower temperatures. The condensation of the driving vapor or the cooling of the driving gas is generally effected by cooling liquids, for example cooling water. However, such condensation or cooling can also be effected by devices operating without cooling liquid. Cooling devices of the latter type may comprise thermocouples, preferably in such an arrangement that the energy consumed thereby can be thermoelectrically regained.

The invention will be further described with reference to the embodiments of the invention illustrated by way of example on the accompanying drawings in which.

Figure 1:
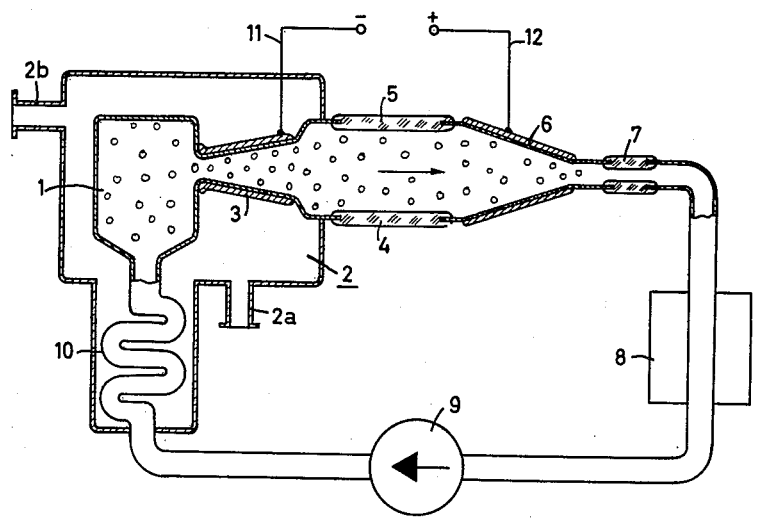
FIG. 1 shows schematically and in section a first embodiment of a thermionic converter.

The thermionic converter according to FIG. 1 comprises a boiler or assembly of heating surfaces 1 within a furnace or firing chamber 2. The gas-vapor mixture in the boiler is heated by the thermal energy to be converted.

The firing chamber 2 is shown to be provided with an inlet duct 2a and an outlet duct 2b for the supply and discharge of hot combustion gases, or for the supply of fuel at 2a and the discharge of flue gases at 2b. As explained, the medium in boiler 1 may consist of argon and mercury vapor and contains an addition of cesium or other metal from the above-identified main group of the periodic system. Connected with the boiler 1 is a tubular cathode structure 3 of metal which, together with the adjacent boiler portion, forms a Laval nozzle whose cross section widens in the travel direction of the medium on the downstream side of a constricted cross-sectional area. The material for the nozzle cathode has a high work function at its active surface contacting the metal-laden gaseous medium, this work function being greater than the ionization function of the metal addition to be ionized. Suitable for the nozzle cathode 3 is tungsten, tantalum or molybdenum, for example. Coaxially adjoining to the nozzle cathode 3 is a boiler-like chamber 4. A portion of its cylindrical wall is constituted by an insulating sleeve 5. The boiler chamber 4 is closed by a funnel-shaped anode 6 of metal which tapers in the flow direction of the fluid medium. During operation, the ions become discharged at the anode 6. In contrast to the normally hot nozzle cathode 3, the material of the colder anode 6, at its active surface area, has a smaller work function than the ionization work function of the metal addition. This low work function can be inherent in the material of the anode structure 6 itself or in an absorption coating on the active surface of the anode. In principle, the anode can be made of the same material as the cathode, namely tungsten, tantalum or molybdenum; steel is also applicable in some cases. However, the work function to be considered is not that of the pure metal but that of the metal active at the surface, for example the work function of the cesium coating the surface. The work function of such a cesium coating is generally lower than the ionizing voltage of the cesium vapor. The active anode surface may also be coated with the other low work-function materials such as barium, or the anode may consist of barium-coated nickel or silver oxide coated with cesium, but the above-mentioned use of tungsten, tantalum or molybdenum conjointly with a cesium addition to the fluid medium is preferable.

The narrow end of the funnel-shaped anode 6 is connected with the boiler 1 through a circulatory system for the fluid medium, comprising an insulating conduit 7, a cooler 8, a compresor 9 and, if desired, also a preheater 10. Preferably, such a preheater is likewise heated by the heat to be converted as is the case in the illustrated embodiment.

The operation of the converter is as follows. The heat to be converted, produced for example by a gas flame, is used for heating the metal-laden driving medium (argon and cesium vapor) in boiler 1, an amount of heat being also applied to the cathode nozzle structure 3 and thus imparted to the gas-vapor mixture passing thereto. The preheated medium is partially ionized as it travels in contact with the nozzle wall of the cathode 3. As the medium leaves the Laval nozzle in ionized condition while converting its high thermal energy into kinetic energy, it is now capable of transporting the ions against a high counter voltage. The median thermal energy of a vapor molecule at a temperature of the heated chamber of 1500° C. is at 0.15 ev. Due to the addition of the readily ionizable metal-vapor component of the medium, such as cesium, or by suitable choice of the temperature obtaining at the ionizing cathode, the ionizing degree can be adjusted, for example to 1 per mil. With this particular adjustment a maximum utilizable voltage between cathode and anode of about 150 volt is attainable. This voltage can be taken off by means of leads 11 and 12 that are connected to negative and positive output terminals respectively. Higher useful output voltages are obtainable by lowering the ionizing degree until a limit is reached at which by instability a breakdown within the vapor jet in the converter takes place. The metal-vapor ions become neutralized at the anode 6, which corresponds to a transportation of positive current from the cathode 3 to the anode 6. In the cooler 8 the temperature of the driving medium is reduced to a lower value. Through the compressor 9 and the preheater 10, the ionizable metal addition together with the driving medium is returned to the boiler 1 to repeat the circulatory performance. If mercury vapor or other condensable vapor is used as a driving medium, the vapor is preferably in condensed form when passing into the preheater 10 or boiler 1.

The above-described performance results in a continuous direct-current voltage which can be kept substantially constant. Substantially the same converter can also be used for generating a periodically variable voltage which, if desired, can be transformed into an alternating voltage. For this purpose, the above-described circulatory system is additionally equipped with means for periodically varying the speed of the circulating medium. Auxiliary devices of this kind are illustrated at A, B and C in FIG. 2. Each of these devices can be inserted into the conduit portion between the components 9 and 10 of FIG. 1. According to FIG. 2, this conduit portion 20 is provided with a bellows 21, preferably of metal, whose volume is periodically varied by a cam drive 22 operated by an electric motor, thus periodically varying the speed of the mixture flowing through the circulatory system.

Figure 2:
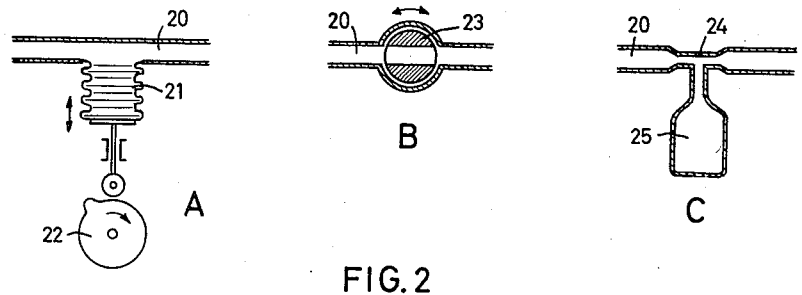
FIG. 2 shows three alternatively applicable auxiliary components for use in the converter system.

An alternative device for the same purpose may comprise a rotating valve 23 as shown at B in FIG. 2. By continuously rotating the valve, the speed of the circulating mixture is periodically varied between zero and the maximum value.

Shown at C in FIG. 2 is another device for periodically varying the speed of the flowing medium and thereby the generated output voltage. A fixed-volume container 25 communicates with a constricted conduit portion 24 located between components 9 and 10 (FIG. 1) of the circulatory system. The device operates gas-dynamically in substantially the same manner as an organ pipe. By changing the volume of container 25, the oscillating frequency of the pipe can be varied, and the speed of the gas flow in the thermionic generator is modified at the same frequency, thus imposing upon the generated electric voltage a corresponding variation.

As a rule, the output voltage produced with such accessory devices has a direct-current component and a super-imposed alternating component. By connecting the output terminals with the primary winding of a transformer, the secondary circuit of the transformer furnishes an alternating voltage whose frequency corresponds to that determined by the operation of the accessory device.

Figure 3:
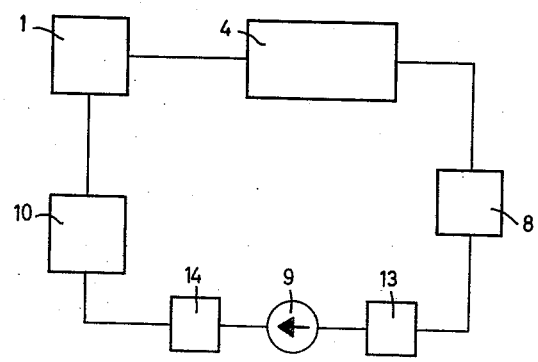
FIG. 3 is a schematic block diagram of an electric generator plant comprising three converters.

As mentioned above, the efficiency of thermionic generation of electrical current can be increased by utilizing the heat content of the electrically discharged fluid in another energy converter. An embodiment of a generator plant based upon this principle is represented by the block diagram shown in FIG. 3. Denoted by 1 is the boiler, by 4 the energy converter, by 8 the cooler and by 10 the preheater of a converter as described above with reference to FIG. 1. However, the circulatory system for the medium does not directly extend from the cooler 8 through the compressor 9 to the preheater 10 but includes in series two additional energy converters 13 and 14 each designed and operative in accordance with the converter described above with reference to FIG. 1, except that the performance of converter 13 is rated for a lower temperature than that of converter 4, and the performance of converter 14 is rated for a still lower temperature, thus utilizing in each subsequent converter of the circulatory system the heat still contained in the circulating medium. The cooler 10 may be operated with or without cooling liquid. For example, it may operate thermoelectrically.

Figure 4:
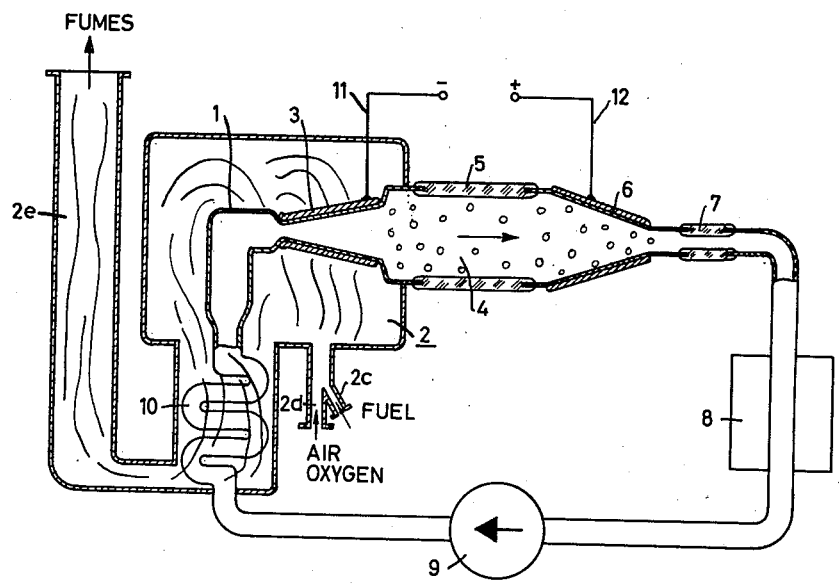
FIG. 4 shows schematically and in section another embodiment of a converter.

The converter illustrated in FIG. 4 is substantially similar to that of FIG. 1, as is apparent from the use of the same reference numerals in both illustrations for similar components respectively. As shown in FIG. 4, the firing chamber of the furnace 2 is supplied with fuel, such as gas, at 2c and with combustion air or oxygen at 2d. The cathode structure 3 is directly exposed to the gas flames, and the combustion gases then pass downwardly along the boiler portion 1 and the preheater 10 into a flue and chimney 2e. The heat contained in the waste gases passing through the flue can be utilized by means of thermocouples, such as one or more banks of thermoelectric generators.

We claim:

1. A thermionic energy converter comprising a low-pressure vessel having a cathode and an anode insulated and spaced from each other, a fluid circulation system comprising said vessel and having compressing means in series with said vessel, said system containing a mixture of a fluid driving medium and an ionizable metal addition finely distributed in said driving medium, said cathode and anode having respective active surface areas contactable by said mixture, said active surface area of said cathode having a work function higher than the ionizing function of said metal addition, said active surface area of said anode having a work function lower than said ionizing function, said system having a fluid-flow direction from said cathode to said anode, heating means thermally joined with said vessel for heating said mixture near said cathode, whereby said metal addition is ionized when contacting said cathode and the ions are thereafter electrically discharged when contacting said anode, and two electric terminals connected to said anode and cathode respectively to provide electric energy.

2. A thermionic energy converter comprising a low-pressure vessel having a tubular cathode and a tubular anode insulated from each other, a fluid circulation system extending through said vessel and through said cathode and anode, said system containing a mixture of fluid driving medium and an addition of at least one metal selected from the lithium subgroup in group one of the periodic system of elements, said system having compression means outside said vessel, said cathode and anode having respective active inner surface areas contactable by said mixture, said active surface area of said cathode having a work function higher than the ionizing function of said metal addition, said active surface area of said anode having a work function lower than said ionizing function, said system having a fluid-flow direction from said cathode to said anode, heating means thermally joined with said vessel for heating said mixture near said cathode, whereby said metal addition is ionized when contacting said cathode and the ions are thereafter electrically discharged when contacting said anode, and two electric terminals connected to said anode and cathode respectively to provide electric energy.

3. In a thermionic energy converter according to claim 2, said heating means being thermally joined with said tubular cathode for directly heating said cathode by the heat to be converted and transferring heat from said cathode to said fluid mixture.

4. In a thermionic energy converter according to claim 1, said heating means comprising a firing chamber and a boiler, said boiler being serially connected in said circulation system ahead of said cathode and being disposed in said firing chamber to be heated by the heat to be converted.

5. In a thermionic energy converter according to claim 2, said tubular cathode having an outlet portion which forms a Laval nozzle for accelerating said fluid mixture to a speed at least near sonic speed.

6. A thermionic converter according to claim 1, comprising means for adjusting the converter output voltage between said two terminals.

7. A thermionic converter according to claim 1, comprising means for varying the temperature of said active cathode surface to thereby adjust the converter output voltage between said two terminals.

8. In a thermionic energy converter according to claim 1, said driving medium consisting of a condensable vapor.

9. In a thermionic energy converter according to claim 1, said fluid circulation system comprising periodic speed control means for varying the flowing speed of said mixture whereby a periodically variable voltage is produced between said two terminals.

10. In a thermionic energy converter according to claim 1, said fluid circulation system comprising another converter unit serially connected behind said anode in the flow direction of said mixture to receive heat from the electrically discharged mixture.

References Cited in the file of this patent

UNITED STATES PATENTS

| | | |
|---|---|---|
| 1,004,170 | Jocoviello | Sept. 26, 1911 |
| 1,717,413 | Rudenberg | June 18, 1929 |
| 1,916,076 | Rupp | June 27, 1933 |
| 2,980,819 | Feaster | Apr. 18, 1961 |

OTHER REFERENCES

Publication: Electronics, November 1959, page 82.
Publication: Westinghouse Engineer, July 1960, pages 105–107.